US008951611B2

(12) United States Patent
Lee et al.

(10) Patent No.: US 8,951,611 B2
(45) Date of Patent: Feb. 10, 2015

(54) METHODS AND COMPOSITIONS FOR TREATING WOOD

(75) Inventors: Kwangyeol Lee, Bellevue, WA (US); Kraig Anderson, Burlingame, CA (US)

(73) Assignee: Empire Technology Development LLC, Wilmington, DE (US)

( * ) Notice: Subject to any disclaimer, the term of this patent is extended or adjusted under 35 U.S.C. 154(b) by 261 days.

(21) Appl. No.: 13/387,546

(22) PCT Filed: Jul. 11, 2011

(86) PCT No.: PCT/US2011/043536
§ 371 (c)(1),
(2), (4) Date: Jan. 27, 2012

(87) PCT Pub. No.: WO2013/009286
PCT Pub. Date: Jan. 17, 2013

(65) Prior Publication Data
US 2013/0017399 A1    Jan. 17, 2013

(51) Int. Cl.
*B05D 3/10* (2006.01)
*B05D 7/06* (2006.01)
*B05D 3/12* (2006.01)
*B05D 7/08* (2006.01)

(52) U.S. Cl.
CPC *B05D 3/12* (2013.01); *B05D 3/104* (2013.01); *B05D 7/08* (2013.01)
USPC ........... 427/301; 427/324; 427/325; 428/447; 428/452

(58) Field of Classification Search
CPC .......... B05D 3/104; B05D 3/002; B05D 7/06; B05D 7/08
USPC ........... 427/325, 301, 323, 324; 428/447, 452
See application file for complete search history.

(56) References Cited

U.S. PATENT DOCUMENTS

| | | | |
|---|---|---|---|
| 3,974,139 | A | 8/1976 | Noreika et al. |
| 4,124,758 | A | 11/1978 | Watts, Jr. et al. |
| 4,227,929 | A | 10/1980 | Law et al. |
| 4,256,807 | A * | 3/1981 | Jukes et al. ............... 428/379 |
| 4,857,365 | A * | 8/1989 | Hirao et al. ............... 427/297 |
| 5,275,645 | A | 1/1994 | Ternoir et al. |
| 5,693,644 | A | 12/1997 | Teramae et al. |
| 5,985,372 | A | 11/1999 | Saka et al. |
| 7,303,654 | B2 | 12/2007 | Tokarz et al. |
| 7,842,162 | B1 | 11/2010 | Lvov et al. |
| 2003/0087035 | A1 | 5/2003 | Kelsoe |
| 2005/0255251 | A1 | 11/2005 | Hodge et al. |
| 2007/0089846 | A1 | 4/2007 | Kim |
| 2010/0233245 | A1 | 9/2010 | Narayana |
| 2010/0239679 | A1 | 9/2010 | Greene et al. |

FOREIGN PATENT DOCUMENTS

WO    WO 96/27483 A1    9/1996

OTHER PUBLICATIONS

International Search Report and Written Opinion of PCT/US2011/043536 dated Nov. 30, 2011.
Agricultural Research for Development, Annual Report: CIRAD 2007; Borates and vegetable oils-promising wood preservatives, http://www.cirad.fr/en/publications-resources/science-for-all/rapports-annuels/cirad-2007 printed from internet Sep. 2, 2010).
Cummins, Liquid, glass, gel: The phases of colloidal Laponite, *Journal of Non-Crystalline Solids* (2007), 353:3891-3905.
da Silva Filho et al., Preparation of ethylenediamine-anchored cellulose and determination of thermochemical data for the interaction between cations and basic centers at the solid/liquid interface, *Carbohydr Res.* (Dec. 11, 2006), 341(17):2842-2850 (Abstract).
Kubitschek, Cell Volume Increase in *Escherichia coli* after Shifts to Richer Media, *Journal of Bacteriology* (Jun. 5, 1989), 172(1):94-101.
Liu et al., A novel approach of chemical functionalization on nanoscaled silica particles, *Nanotechnology* (Jan. 29, 2003), 14(7):813 (Abstract).
Lyon et al., Development of boron/linseed oil combined treatment as wood protection, Evaluation of boron fixation and resistance to termites according to Japanese and European standards, Conference in Taipei, Taiwan, Oct. 29-Nov. 2, 2007.
Schultz et al., Long-Term Outdoor Efficacy Trials of Wood Treated with Organic Biocides and Co-Added Non-Biocidal Additives, from the Proceedings of the One Hundred Fourth Annual Meeting of American Wood Protection Association; pp. 96-102, (May 2008).
Palanti et al., New preservatives based on copper chelates and copper complexes grafted to functionalized silica gel, Cost Action E37 Final Conference in Bordeaux (2008), pp. 23-30.
Terada et al., Adsorption of cationic cellulose derivative/anionic surfactant complexes onto solid surfaces. II. Hydrophobized silica surfaces, *Langmuir* (Aug. 3, 2004), 20(16):6692-6701 (Abstract).
Tshabalala et al., Surface Modification of Wood by Alkoxysilane Sol-Gel Deposition to Create Anti-mold and Anti-fungal Characteristics, *Silanes and Other Coupling Agents* (2009), 5:135-147.
Williams et al., Antimicrobial properties of novel n-halamine siloxane coatings, *Surface Coatings International Part B: Coatings Transactions* (Mar. 2005), 88(1):35-39 (Abstract).
Yamaguchi, Silicic acid/boric acid complexes as ecologically friendly wood preservatives, *Forest Products Journal* (Jan. 1, 2005), pp. 1-9.
Zakis et al., Paper: Amino derivatives of lignin. 4. Amination of lignin in composition of lignocellulose complex—obtaining of bile acid sorbent, Publication of RIGA Technical University (2010), Abstract.
Predieri et al., New preservatives based on copper chelates and copper complexes grafted to functionalized silica gel, Presentation for Cost Action E37 Final Conference in Bordeaux (2008), pp. 1-23.
Sang et al., Preparation and application of cationic cellulose fibers modified by in situ grafting of cationic PVA, *Colloids and Surfaces A: Physicochemical and Engineering Aspects* (Mar. 5, 2009), 335(1-3):121-127 (Abstract).
Tshabalala et al., Accelerated weathering of wood surfaces coated with multifunctional alkoxysilanes by sol-gel deposition, *Journal of Coatings Technology*, 75(943):37-43, Abstract, (Aug. 2003).

* cited by examiner

*Primary Examiner* — Kirsten Jolley
(74) *Attorney, Agent, or Firm* — Pepper Hamilton LLP

(57) ABSTRACT

Methods of treating wood including modifying a cell wall of the wood to be positively charged to form a cationic wood cell wall; and contacting a negatively charged silicon layer to the cationic wood cell wall to form a barrier, wherein the negatively charged silicon layer includes a silicate ester group, a silinol group, a silicon oxide group or a combination thereof are described. Treated wood compositions including a wood structure having an outer layer including a wood cell having a cell wall attached to a silicon layer which includes a silicate ester group, a silinol group, a silicon oxide group or a combination thereof are also described.

25 Claims, 8 Drawing Sheets

METHODS AND COMPOSITIONS FOR TREATING WOOD

CLAIM OF PRIORITY

This application is a national phase application under 35 U.S.C. §371 of International Application No. PCT/US2011/043536, filed Jul. 11, 2011, which is incorporated herein by reference in its entirety.

BACKGROUND

Wood preservatives extend the life of the wood and increase durability and resistance to insects and diseases. For example, wood preservatives are used to stop bacterial infiltration into wood structure, which contains numerous pores and channels which act as an easy access route for bacteria and also fungal spores. Wood has been traditionally treated with arsenic containing preservatives, but such arsenic containing preservatives are being phased out from the market due to increased health and environmental concerns. Accordingly, alternative wood treatments such as petrification, heat treatment, and polymer composite formation have been developed. The effectiveness of the newer techniques is inferior to the arsenic-based preservatives. Therefore, better techniques for wood preservation need to be developed.

For effective wood preservation, one strategy includes impregnating the wood cell walls with environmentally benign but highly potent wood preservatives. The development of such typically conflicting properties in a single preservative is time-consuming and difficult. Other strategies may include creating petrified wood (in which silicon dioxide is impregnated into the wood pore) and polymer-impregnated wood composites. For example, sodium silicate ($Na_2SiO_3$) may be used as a deterrent against insect attack and possesses minor flame-resistant properties. However, it is easily washed out of the wood by moisture, forming a flake-like layer on top of the wood.

The wood treated with the above strategies may be much heavier than the original wood and the mechanical properties may be very different from the original, including, for example, being harder and more abrasive on tools. Therefore, the usage of wood items treated by these methods may be severely limited. Furthermore, once treated by these methods, the wood often cannot be easily repurposed or recycled. Accordingly, there exists a need for a protective coating for wood which allows the use of the wood for varied purposes and preserves the original wood's physical properties.

Wood preservatives may be used to provide water resistance, antifungal activity, termite control, etc. However, such wood preservatives cannot be loosely loaded into wood at high levels due to environmental leaching. Therefore, there exists a need for a wood coating where a small requisite amount of a wood preservative functional agent coats the wood and is tightly coupled to effectively cover the area in need of a particular agent to prevent leaching.

SUMMARY

Some embodiments described in this document provide for a method of treating wood including modifying a cell wall of the wood to be positively charged to form a cationic wood cell wall, and contacting a negatively charged silicon layer to the cationic wood cell wall to form a barrier, in which the negatively charged silicon layer includes a silicate ester group, a silanol group, a silicon oxide group, or a combination thereof.

Some embodiments described in this document provide for a treated wood composition obtained by a method including modifying a cell wall of the wood to be positively charged to form a cationic wood cell wall, and contacting a negatively charged silicon layer to the cationic wood cell wall to form a barrier, in which the negatively charged silicon layer includes a silicate ester group, a silanol group, a silicon oxide group, or a combination thereof.

Some embodiments describe a treated wood composition including a wood structure having an outer layer including a wood cell having a cell wall attached to a negatively charged silicon layer, in which the negatively charged silicon layer includes a silicate ester group, a silanol group, a silicon oxide group, or a combination thereof. In some embodiments, a kit for treating wood comprising a wood cell wall modifier and a silicon compound including a silicate ester group, a silanol group, a silicon oxide group, or a combination thereof, is provided.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
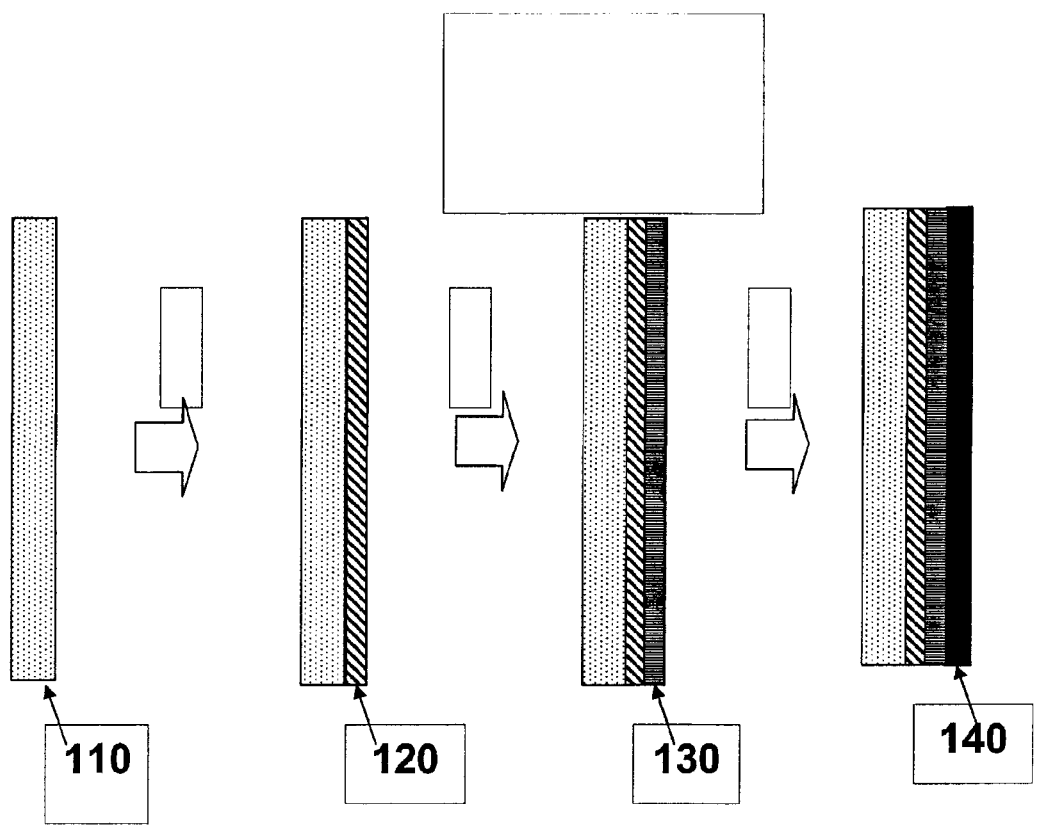
FIG. 1 illustrates a wood at different stages during a method of treating wood according to some embodiments described in this document.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented in this document. It will be readily understood that the aspects of the present disclosure, as generally described in this document, and illustrated in the figures, can be arranged, substituted, combined, separated, and designed in a wide variety of different configurations, all of which are explicitly contemplated in this document.

Figure 2:
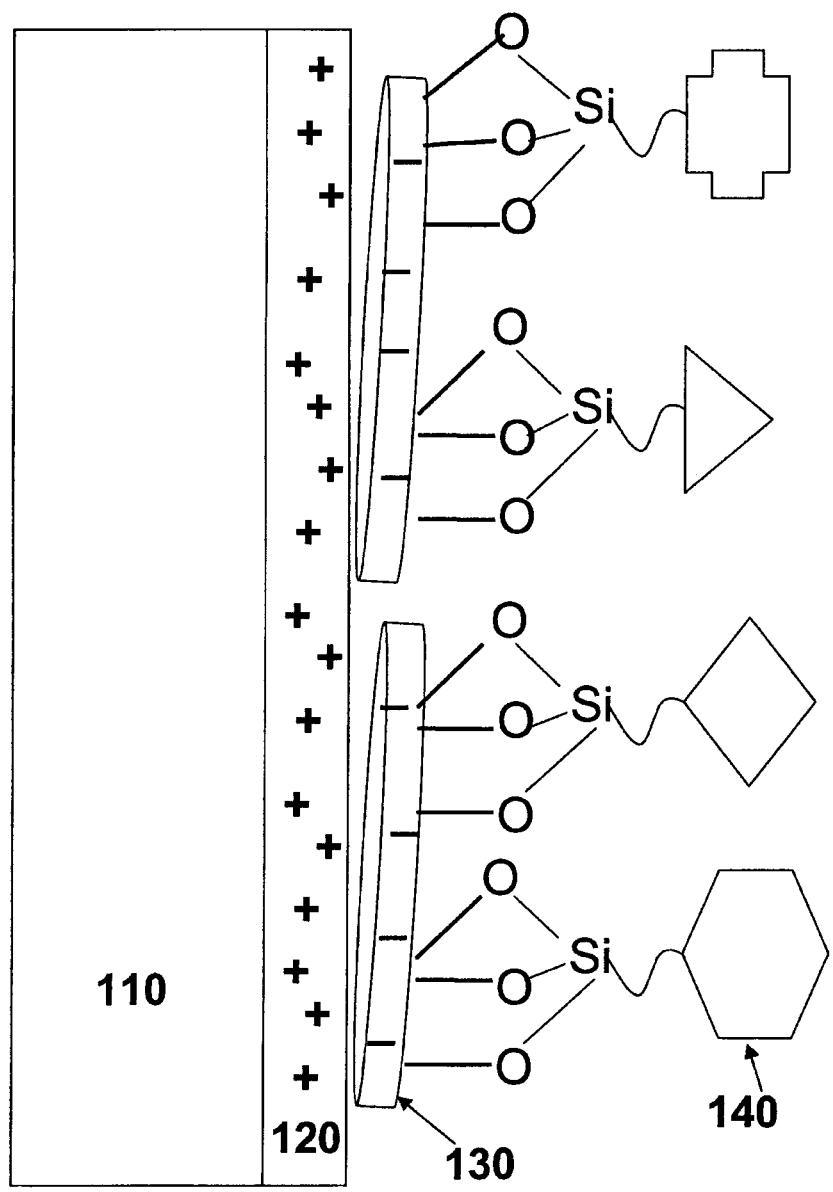
FIG. 2 is a conceptual illustration of an exemplary treated wood composition according to some embodiments described in this document.
Figure 3:
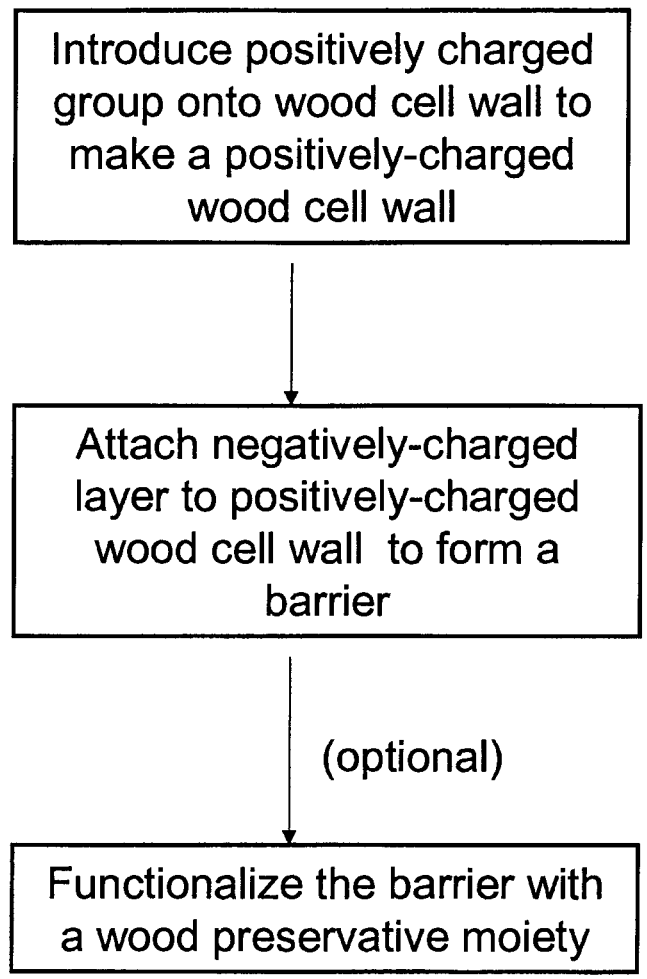
FIG. 3 illustrates an exemplary method of treating wood according to some embodiments described in this document.

Some embodiments provided in this document describe a method of treating wood. FIG. 1 illustrates a wood at various stages of a wood treatment process. With reference to FIGS. 1 and 3, in some embodiments, a cell wall 110 of the wood may be modified to be positively charged to form a cationic wood cell wall 120, and a negatively charged silicon layer (e.g., a clay platelet) including at least one silicate ester group, silanol group, or silicon oxide group may be non-covalently attached to the cationic wood cell wall 120 and form a barrier 130. A wood preservative 140 also may be attached to the barrier 130. With reference to FIG. 2, a conceptual illustration, in some embodiments, the wood preservative 140 may be an antifungal agent (shown as a triangle-shaped symbol), an antimicrobial agent (shown as a "plus"-shaped symbol), an insecticidal agent (shown as a diamond-shaped symbol), a water-proofing agent (shown as a hexagon-shaped symbol), or a combination thereof.

One skilled in the art will appreciate that, for this and other processes and methods disclosed in this document, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In some embodiments, the wood is bulk wood. As used in this document, bulk wood refers to wood having lignin, cellulose, and extractive content. In some embodiments, modifying the cell wall includes derivatization of —OH groups on the wood cell wall with positively charged moieties. Without wishing to be bound by theory, it is believed that this cationic cell wall may electrostatically attract a coating of negatively charged compounds, such as, without limitation, silicate clay platelets. Advantageously, this may avoid the need for significant modification of the —OH groups in the cellulose or lignin. In some embodiments, modifying the cell wall may be through covalent modification. In some embodiments, the cationic cell wall may comprise a quaternary ammonium group, a quaternary phosphonium group, a formamidinium group, a cationic heterocyclic group, or a combination thereof.

In some embodiments, modifying the cell wall may be through covalent modification. In some embodiments, modifying the wood cell wall may include covalently bonding a plurality of —OH groups on the wood cell wall to a compound having a $NH_2$ group and protonating the $NH_2$ group to form a cationic wood cell wall. In some embodiments, modifying the wood cell wall may comprise covalently bonding a plurality of —OH groups on the wood cell wall to a compound having a $NH_3^+$ group to form a cationic wood cell wall. Without wishing to be bound by theory, it is believed that having an amine group covalently linked to the wood cell wall may provide homogenous interaction of the wood cell wall with the negatively charged silicon layer.

In some embodiments, the cell wall may be modified through amination, hydroxyethylation, protonation, or a combination thereof. In some embodiments, modifying the cell wall may include reductive amination of cellulose; selective amination of lignin in the presence of cellulose; reaction of cellulose with thionyl chloride followed by ethylene diamine; or copolymerization of vinyl acetate and diallyldimethyl ammonium chloride onto softwood sulphite pulp fibers. In some embodiments, modifying the cell wall may include reductive amination of cellulose using a compound selected from ammonia, ammonium hydroxide, or an alkylamine. In some embodiments, modifying the cell wall may include reductive amination of cellulose using a compound selected from ammonia, ammonium hydroxide, or an alkylamine in the presence of hydrogen or a reducing catalyst. In some embodiments, modifying the cell wall may include reaction of cellulose with thionyl chloride followed by ethylene diamine to give 6-(2'-aminoethylamino)-6-deoxy-cellulose.

In some embodiments, modifying the cell wall may include hydroxyethylation with an epoxy compound substituted with a positively charged group or a precursor of a positively charged group. For example, in some embodiments, modifying the cell wall may include aminoalkylation of free hydroxyl groups in lignin or cellulose using a dialkylamine-substituted epoxy compound, e.g., 2,3-epoxy-N,N-diethylamino propane. In some embodiments, modifying the cell wall may include selective aminoalkylation of lignin using diethylamino epoxy propylamine in the presence of cellulose. Wood functionalized in this manner includes diethylamino functional groups, which may be positively charged by protonation (e.g., via contact with a dilute acid) or by further alkylation, e.g., by reaction with a haloalkane such as methyl iodide. In some embodiments, modifying the cell wall may include reaction of free hydroxyl groups in lignin or cellulose using a trialkylamino-substituted epoxy compound, e.g., 2,3-epoxy-N,N,N-triethylammonium propane bromide. Wood functionalized in this manner includes a positively charged quaternary ammonium group.

In some embodiments, other positively charged groups may be introduced into the cell wall by hydroxyethylation with a epoxy compound substituted with a positively charged group or a precursor of a positively charged group, e.g., a phosphonium group, a formamidinium group, a cationic heterocyclic group, or the like.

In some embodiments, modifying the cell wall includes contacting the cell wall with a compound having an amine group in the presence of a base catalyst to form an amine cell wall. In some embodiments, the compound having an amine group may be ammonium hydroxide, alkylamine, ammonia, diethylaminoepoxypropylamine, diallyldimethyl ammonium chloride or ethylene diamine. In some embodiments, the base catalyst may be a nickel acetoacetate catalyst. In some embodiments, modifying the cell wall further includes contacting the amine cell wall with a dilute acid buffer to protonate the wood cell wall and form a cationic wood cell wall.

In some embodiments, attaching the negatively charged silicon layer includes a single step reaction. In some embodiments, the negatively-charged layer may be attached to the cationic wood cell wall through a non-covalent interaction. In some embodiments, the negatively-charged layer may be attached to the cationic cell wall through a charge-charge interaction.

In some embodiments, the negatively charged silicon layer may comprise a silicate clay platelet. Silicate-based clay platelets are extremely thin and anionic. Further, they are robust at a wide pH range and can be easily modified with silicon alkoxide compounds. In some embodiments, the silicate clay platelet includes synthetic calcium silicate hydrate, natural silicates, synthetic silicates, alumino silicates, silicon dioxide, nesosilicate, sorosilicate, cyclosilicate, inosilicate, phyllosilicate, tectosilicate, salts thereof, or a combination thereof. In some embodiments, the negatively charged silicon layer includes a silicate ester group or a silicon oxide group. In some embodiments, the negatively charged silicon layer may comprise silicon tetraethoxide. In some embodiments, the silicate clay platelet may be a synthetic clay platelet having the general formula $Na^{+0.7}[Si_8Mg_{5.5}Li_{0.3}H_4O_{24}]^{-0.7}$. In some embodiments, the silicate clay platelet may be a clay platelet sold under the tradename Laponite®.

In some embodiments, the silicate clay platelet may have a diameter of from about 1 nm to about 50 nm, about 1 nm to about 40 nm, about 1 nm to about 30 nm, about 5 nm to about 50 nm, about 5 nm to about 40 nm, about 5 nm to about 30 nm, about 10 nm to about 50 nm, about 10 nm to about 40 nm, about 10 nm to about 30 nm, about 20 nm to about 50 nm, about 20 nm to about 40 nm, about 20 nm to about 30 nm, about 25 nm to about 50 nm, about 25 nm to about 40 nm, or about 25 nm to about 30 nm. Specific examples may include about 1 nm, about 5 nm, about 10 nm, about 20 nm, about 25 nm, about 30 nm, about 40 nm, about 50 nm, and ranges between any two of these values.

In some embodiments, the negatively-charged layer may have a thickness from about 0.1 nm to about 100 nm, about 0.1 nm to about 50 nm, about 0.1 nm to about 40 nm, about 0.1 nm to about 30 nm, about 0.1 nm to about 20 nm, about 0.1 nm to about 10 nm, about 0.1 nm to about 5 nm, about 0.1 nm to about 3 nm, about 0.1 nm to about 2 nm, about 0.1 nm to about 1 nm, 0.5 nm to about 100 nm, about 0.5 nm to about 50 nm, about 0.5 nm to about 40 nm, about 0.5 nm to about 30 nm, about 0.5 nm to about 20 nm, about 0.5 nm to about 10 nm, about 0.5 nm to about 5 nm, about 0.5 nm to about 3 nm, about 0.5 nm to about 2 nm, about 0.5 nm to about 1 nm. Specific examples may include about 0.1 nm, about 0.5 nm, about 0.90 nm, about 0.92 nm, about 0.95 nm, about 1 nm, about 1.5 nm, about 2 nm, about 5 nm, about 10 nm, about 20 nm, about 30 nm, about 40 nm, about 50 nm, about 60 nm, about 70 nm, about 80 nm, about 90 nm, about 100 nm, and ranges between any two of these values.

In some embodiments, the barrier may be a silicon dioxide barrier. In some embodiments, the presence of basic functional groups such as, without limitation, an amine group, in the cationic wood cell wall may facilitate the formation of a silicon dioxide barrier from precursors such as silicon tetraethoxide in the negatively charged silicon layer. In some embodiments, a base such as, without limitation, ammonia may be used to catalyze the conversion of precursors in the negatively-charged layer into the silicon dioxide barrier. In some embodiments, the barrier may resist or prevent the passage of microorganisms that damage wood, such as, without limitation, bacteria, algae, fungi, and the like.

In some embodiments, the wood cell wall attached to the silicate clay platelet may be further linked to a variety of wood preservatives by a simple condensation reaction or addition reaction. Without wishing to be bound by theory, it is believed that this thin negatively-charged layer may allow for more wood preservatives to be functionalized to the wood. Furthermore, the process may be cheaper and more easily scalable than conventional methods and the resulting wood may be lighter and easier to use. Additionally, making the wood water-resistant (i.e. preventing water from entering the wood) with a wood preservative may reduce mold, fungi, bacteria and insect attack.

In some embodiments, the method of treating wood may further comprise attaching a wood preservative to the barrier. In some embodiments, the wood preservative includes a silicon alkoxide, a silane group, a silanol group, or a combination thereof. In some embodiments, the wood preservative may be selected from water-proofing agents, biocides, antibiotics, fungicides, mildewcides, insecticides, preservatives, antimicrobial agents, or a combination thereof. Without wishing to be bound by theory, because the wood preservatives may have different functional groups and different chemistry, it may be impossible to treat wood directly with different functionalities with a single-step reaction. In some embodiments, attaching a wood preservative to the barrier includes using a condensation reaction or an addition reaction. In some embodiments, attaching a wood preservative may include a single-step reaction. In some embodiments, the wood preservative is selected from an alkyl triethoxysilane, a triethyoxysilane bonded to a siloxane polymer, or a combination thereof. Without wishing to be bound by theory, it is believed that the treated wood of embodiments in this document may be advantageous in that it may minimize the amount of wood preservatives needed to coat the wood and may attach the wood preservatives strongly to the clay so that it minimizes leaching into the environment.

In some embodiments, the barrier presents active Si—OH groups. In some embodiments, a wood preservative may be attached to the active Si—OH groups using a condensation reaction or an addition reaction. In some embodiments, the wood preservative may be selected from a water-proofing agent, a biocide, an antibiotic, a fungicide, a mildewcide, an insecticide, a preservative, an antimicrobial agent, or a combination thereof. In some embodiments, the wood preservative may be attached to the barrier using a single-step reaction. For example, in some embodiments, attachment of a wood preservative agent, such as, without limitation, a biocidal agent or a water-proofing agent, equipped with silicon alkoxides may be accomplished through a single condensation reaction. In some embodiments, the water-proofing agent may comprise an alkyl group or a siloxane group.

Figure 4:
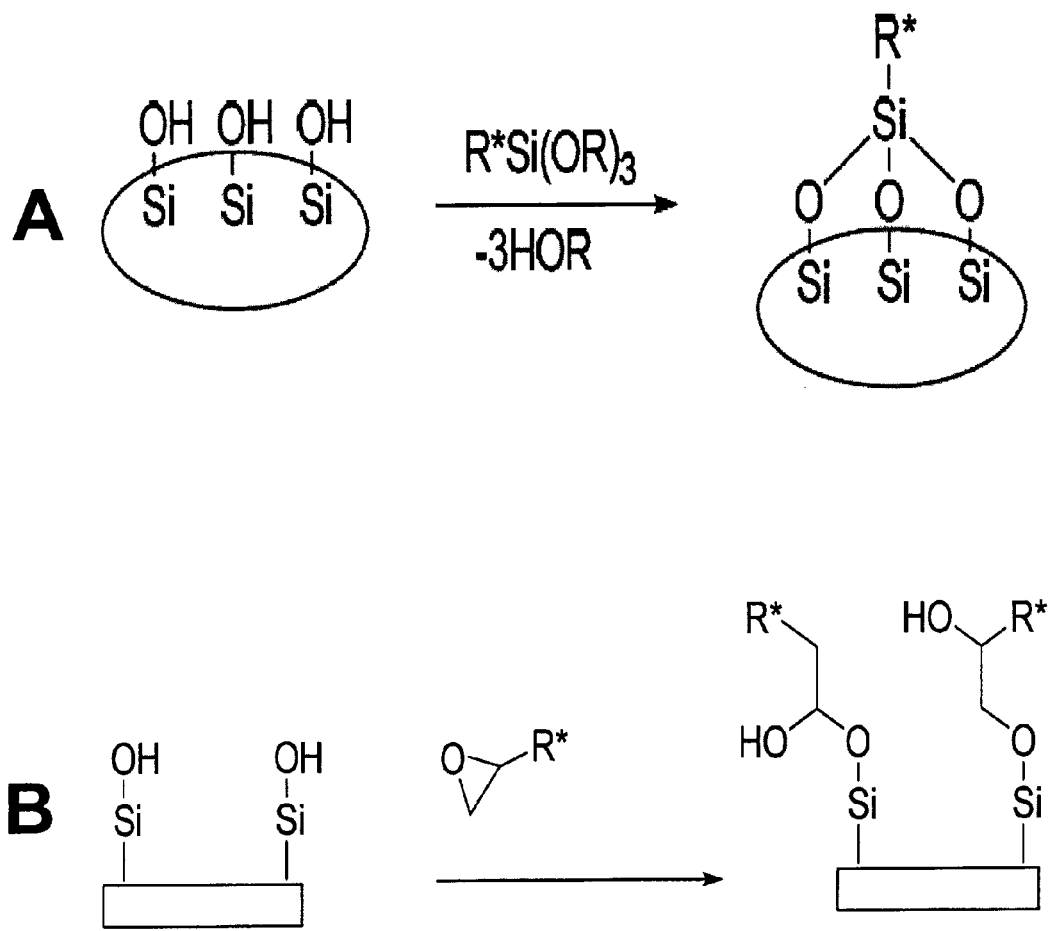
FIG. 4 illustrates (A) an exemplary reaction in which a wood preservative is attached through a condensation reaction to a barrier according to some embodiments described in this document; and (B) an exemplary reaction in which a wood preservative is attached through an addition reaction to a barrier according to some embodiments described in this document.

In some embodiments, attaching a wood preservative may include an acid or base catalyzed reaction of surface Si—OH groups with $R^*$—$Si(OR)_3$, in which $R^*$ is the desired wood preservative agent. For example, as shown in FIG. 4, Part A, the $R^*$ wood preservative may be attached to the Si—OH groups in a condensation reaction. In some embodiments, the wood preservative ($R^*$) may include a quaternary ammonium group, a group capable of chelating a wood-preserving metal ion, or a combination thereof. Specific commercially available compounds where $R^*$ includes a quaternary ammonium group expected to have antimicrobial activity include, for example, trimethyl-(3-(trimethoxysilyl)propyl)ammonium (CAS Reg. No. 35141-36-7), triethoxysilylpropyltrimethylammonium chloride (CAS Reg. No. 84901-27-9), triethyl(3-(triethoxysilyl)propyl)ammonium chloride (CAS Reg. No. 84901-28-0), benzyldimethyl(3-(triethoxysilyl)propyl)ammonium chloride (CAS Reg. No. 85391-03-3), dimethyloctadecyl (3-(triethoxysilyl)propyl)ammonium chloride (CAS Reg. No. 62117-57-1), hexadecyldimethyl(3-(triethoxysilyl)propyl)ammonium chloride (CAS Reg. No. 94134-21-1), tetradecyldimethyl(3-(trimethoxysilyl)propyl)ammonium chloride (CAS Reg. No. 41591-87-1), dodecyldimethyl(3(triethoxysilyl)propyl)ammonium chloride (CAS Reg. No. 62077-89-8). Specific commercially available compounds where R* includes a group capable of chelating (or being hydrolyzed to a group capable of chelating) a wood-preserving metal ion such as copper include, for example, 3-[2-(2-Aminoethylamino)ethylamino]propyl-trimethoxy silane (CAS Reg. No. 35141-30-1), (2-(Triethoxysilyl)ethyl)phosphonic acid diethyl ester (CAS Reg. No. 757-44-8), methyl 3-(trimethoxysilyl)propyl methylphosphonate (CAS Reg. No. 67812-17-3) (2,3-epoxypropyl)dimethyl(3-((16-methylheptadecanoyl)amino)propyl)ammonium chloride (CAS Reg. No. 94349-35-6), or the like.

In some embodiments, as shown in FIG. 4, Part B, the wood preservative may be attached to the barrier through an addition reaction. In some embodiments, for example, the wood preservative (R*) may be attached to the barrier through the use of an oxiranyl group ($C_2H_4O$) attached to the wood preservative agent ($C_2H_4O$—R*), which undergoes an addition reaction with Si—OH groups on the surface of the clay platelets. Specific commercially available oxiranyl compounds where R* includes a quaternary ammonium group expected to have antimicrobial activity include, for example, glycidyl trimethylammonium (CAS Reg. No. 3033-77-0), (2,3-epoxypropyl)ethylbis(2-hydroxyethyl)ammonium chloride (CAS Reg. No. 94213-21-5), (2,3-Epoxypropyl)dimethyl(3-((16-methylheptadecanoyl)amino)propyl)ammonium chloride (CAS Reg. No. 94349-35-6).

Other established wood preservatives, for example, triazole fungicides (such as epoxiconazole, triadimenol, propiconazole, metconazole, cyproconazole, tebuconazole, flusilazole and paclobutrazol or the like), pyrethoid insecticides (such as allethrin, bifenthrin, cyfluthrin, cypermethrin, cyphenothrin, deltamethrin, esfenvalerate, etofenprox, fenpropathrin, fenvalerate, flucythrinate, imiprothrin, cyhalothrin, metofluthrin, permethrin, prallethrin, resmethrin, silafluofen, sumithrin, tau-fluvalinate, tefluthrin, tetramethrin, tralomethrin, transfluthrin, or the like) can be obtained or functionalized with trialkoxysilyl or glycidyl groups for covalent attachment to the clay platelets. For example, epoxiconazole contains an oxiranyl (epoxy) group which may undergo an addition reaction with Si—OH groups on the surface of the clay platelets. Modification of such wood preserving agents for attachment to the negatively charged silicon layer is within the skill of one in the art, for example, many pyrethoid insecticides contain a terminal phenoxyl group, which can be replaced with a (trialkoxysilyl)phenoxyl group or glycidyl-phenoxyl group to permit covalent attachment using the condensation or addition reactions described above.

In some embodiments, the wood preservative may comprise a silicon alkoxide, a silane group, a silanol group, or a combination thereof. In some embodiments, the wood preservative may be selected from an alkyl triethoxysilane, a triethyoxysilane bonded to a siloxane polymer, or a combination thereof.

Figure 12:
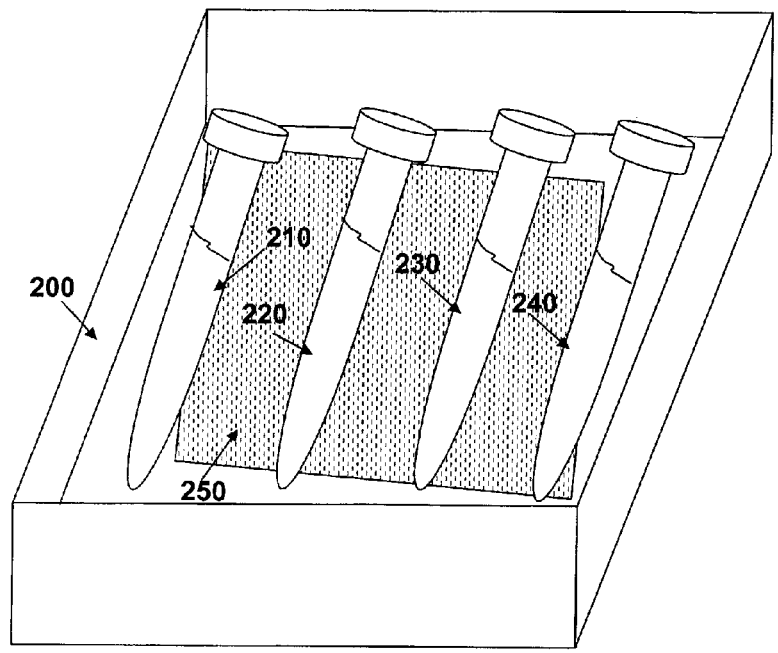
FIG. 12 illustrates an exemplary kit of an embodiment described in this document.

Referring to FIG. 12, in some embodiments, a kit for treating wood may include a wood cell wall modifier 210 and a silicon compound 220 including a silicate ester group, a silanol group, a silicon oxide group, or a combination thereof. In some embodiments, the wood cell wall modifier 210 includes a compound selected from a quaternary ammonium group, a quaternary phosphonium group, a formamidinium group, a cationic heterocyclic group, or a combination thereof. In some embodiments, the silicon compound 220 includes synthetic calcium silicate hydrate, natural silicates, synthetic silicates, alumino silicates, silicon dioxide, nesosilicate, sorosilicate, cyclosilicate, inosilicate, phyllosilicate, tectosilicate, salts thereof, or a combination thereof.

In some embodiments, the kit may further include a wood preservative 230. In some embodiments, the wood preservative 230 may be selected from water-proofing agents, biocides, antibiotics, fungicides, mildewcides, insecticides, preservatives, antimicrobial agents, or a combination thereof that is functionalized to the silicate platelet. In some embodiments, the wood preservative 230 comprises a silicon alkoxide group, a silane group, silanol group, or a combination thereof.

In some embodiments, the kit may further include a housing 200. The housing of such kits may be formed from a relatively rigid material (such as a metal or rigid plastic case or box, or a wall-mounted cabinet) or a flexible pouch (made, for example, from a cloth or foam-type material). In some embodiments, the housing may have one or more chambers for holding the kit's contents. In some embodiments, the housing may be a relatively rigid case having a main body and a lid. The main body may have an interior configured to receive, hold, and maintain the components of the kit. The kits may include one or more containers such as, without limitation, vials, test tubes or bottles, with each container containing a separate component for carrying out a processing or preparing step according to the present disclosure.

The kit may further include an instruction sheet 250 that outlines the procedural steps of the methods, and will follow substantially the same procedures as described in this disclosure. The instruction information may be in a computer readable media containing machine-readable instructions that, when executed using a computer, cause the display of a real or virtual procedure of making a glass fortified wood of disclosed embodiments. The instructions for practicing the subject methods are generally recorded on a suitable recording medium. For example, the instructions may be printed on a substrate, such as paper or plastic, etc. As such, the instructions may be present in the kits as a package insert, in the labeling of the container of the kit, or components thereof (i.e., associated with the packaging or sub-packaging), etc. In other embodiments, the instructions are present as an electronic storage data file present on a suitable computer readable storage medium, e.g. CD-ROM, diskette, etc. In yet other embodiments, the actual instructions are not present in the kit, but means for obtaining the instructions from a remote source, e.g. via the interne, are provided. An example of this embodiment is a kit that includes a web address where the instructions can be viewed and/or from which the instructions can be downloaded. As with the instructions, this means for obtaining the instructions is recorded on a suitable substrate.

In addition to the components noted above, the kits may also include one or more control samples 240 and reagents, e.g., two or more control samples. Such control samples may take any form, e.g., negative and positive control samples for use in analyzing the treated wood, etc. Any convenient control sample may be employed in the subject kits.

Embodiments illustrating the method and materials used may be further understood by reference to the following non-limiting examples.

EXAMPLE 1

Preparation of a Treated Cedar Sapwood Block

Step 1A—Formation of a Cationic Wood Cell Wall: A dried cedar sap wood block (30 cm×10 cm×2 cm) will be pressure impregnated with ammonium hydroxide under a reducing atmosphere ($H_2$), with a small amount of nickel acetoacetate catalyst. The combination will be heated for 1 hour at 50° C., then cooled, rinsed, and briefly impregnated with a dilute acidic buffer (e.g., dilute citric acid) to neutralize any remaining ammonium hydroxide and to protonate/positively charge the amine groups now incorporated into the wood. A sample of the resulting aminated wood block will be tested to determine the percent incorporation of amine groups.

Step 1B—Formation of a Barrier: An aqueous exfoliated suspension of negatively charged clay platelets will be formed by adding approximately 1 g of suitable clay (e.g., Laponite® clay) per 50 mL water and stirring until clear. The aminated wood block of Step 1A will be pressure-treated with the aqueous suspension so that the negatively charged exfoliated clay platelets form a barrier at the wood by electrostatic association with the positively charged amine groups.

Figure 5:
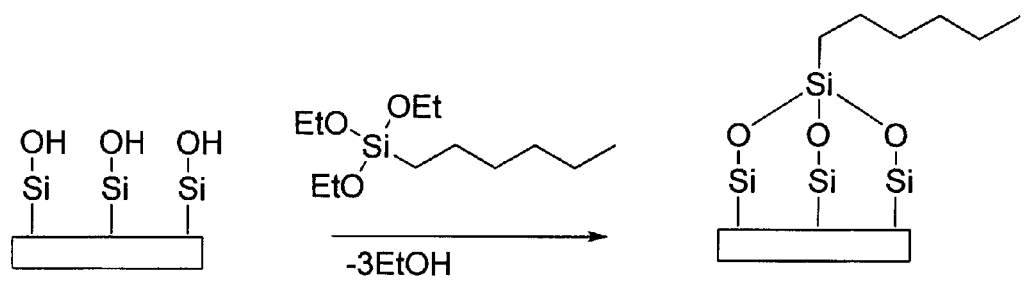
FIG. 5 illustrates the functionalization of clay platelets with hexyl groups by a condensation reaction according to an embodiment described in this document.

Step 1C—Functionalization of Barrier with Wood Preservatives: The clay platelets at the wood will be functionalized by a condensation reaction, as shown in FIG. 5, between hexyl-Si(OEt)$_3$ and available Si—OH groups on the surface of the clay platelets. The reaction results in surface functionalization of the clay platelets with the hexyl groups. The wooden cedar block having cationic wood cell walls and negatively charged clay platelets functionalized with hexyl groups will display improved resistance to mold, fungi, bacteria, and insect attack relative to a similar untreated wooden cedar block.

EXAMPLE 2

Preparation of a Treated Pine Wood Block

Step 2A—Formation of a Cationic Wood Cell Wall: A dried pine wood block will be impregnated with N,N-dimethyl amine in the presence of hydrogen (H$_2$). The impregnated wood block will be heated for 1.5 hour at 45° C., then cooled and contacted with a dilute citric acid buffer to protonate the dimethylamine groups now incorporated into the wood.

Step 2B—Formation of a Barrier: An aqueous exfoliated suspension of negatively charged clay platelets will be formed by adding approximately 1 g of suitable clay (e.g., Laponite® clay) per 50 mL water and stirring until clear. The aminated wood block of Step 2A will be pressure-treated with the aqueous suspension so that the negatively charged exfoliated clay particles form a barrier at the wood by electrostatic association with the positively charged amine groups.

Figure 6:
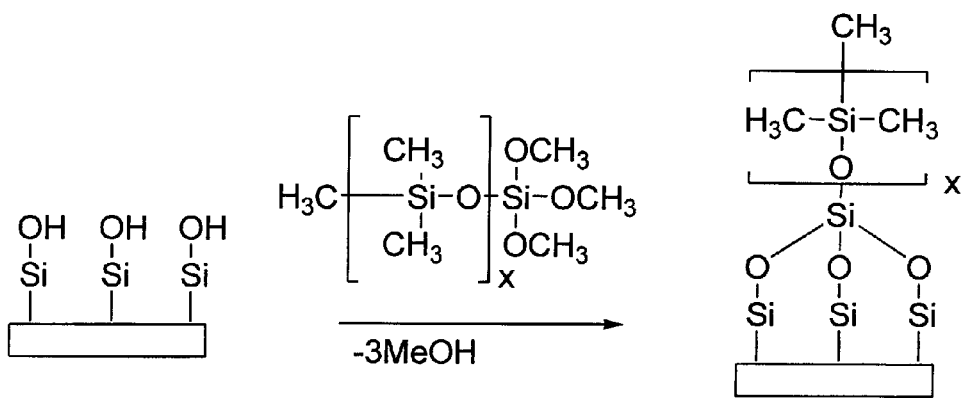
FIG. 6 illustrates the functionalization of clay platelets with a polydimethylsiloxane $CH_3-(OSi(CH_3)_2)_x-Si(OEt)_3$ group by a condensation reaction according to an embodiment described in this document.

Step 2C—Functionalization of Barrier with Wood Preservatives: The clay particles at the wood will be functionalized by a condensation reaction, as shown in FIG. 6, between a reactive polydimethylsiloxane CH$_3$—(OSi(CH$_3$)$_2$)$_x$—Si(OEt)$_3$ and available Si—OH groups on the surface of the clay platelets. The treated pine block will display improved resistance to fungi and insect attack relative to a similar untreated pine wood block.

EXAMPLE 3

Preparation of a Copper Chelate Treated Maple Wood Block

Step 3A—Formation of a Cationic Wood Cell Wall: A dried maple sapwood block will be impregnated with 2,3-epoxy-N,N-diethylamino propane. The impregnated wood block will be heated for 1.0 hour at 55° C., then cooled, rinsed, and briefly impregnated with a dilute citric acid solution to protonate the amine groups now incorporated into the wood.

Step 3B—Formation of a Barrier: An aqueous exfoliated suspension of negatively charged clay platelets will be formed by adding approximately 1 g of suitable clay (e.g., Laponite® clay) per 50 mL water and stirring until clear. The aminated wood block of Step 3A will be pressure-treated with the aqueous suspension so that the negatively charged exfoliated clay particles form a barrier at the wood by electrostatic association with the positively charged amine groups.

Figure 7:
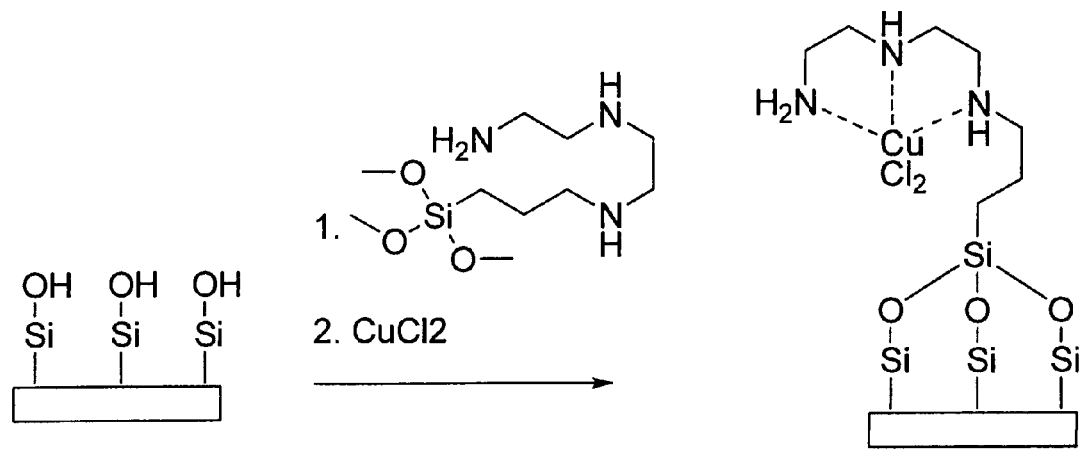
FIG. 7 illustrates the functionalization of clay platelets with a triamine chelating group by a condensation reaction according to an embodiment described in this document.

Step 3C—Functionalization of Barrier with Wood Preservatives: The clay platelets at the wood will be functionalized by a condensation reaction, as shown in FIG. 7, between 3-[2-(2-Aminoethylamino)ethylamino]propyl-trimethoxy silane (CAS Reg. No. 35141-30-1) and available Si—OH groups on the surface of the clay platelets, followed by contact with a copper salt solution such as copper (II) chloride. The 3-[2-(2-Aminoethylamino)ethylamino]propyl-trimethoxy silane will react to provide a triamine chelating group linked at the surface of the clay platelet. This group will chelate the added copper salt, thus retaining it at the clay platelet as a wood preservative. Thus functionalized, the maple block will display improved resistance to fungi and insect attack relative to a similar untreated maple sapwood block.

EXAMPLE 4

Preparation of a Treated Douglas Fir Wood Block

Step 4A—Formation of a Cationic Wood Cell Wall: A dried Douglas fir wood block (30 cm×10 cm×2 cm) will be pressure impregnated with ammonium hydroxide under a reducing atmosphere (H$_2$), with a small amount of nickel acetoacetate catalyst. The combination will be heated for 1 hour at 50° C., then cooled, rinsed, and briefly impregnated with a dilute acidic buffer (e.g., dilute citric acid) to neutralize any remaining ammonium hydroxide, and to protonate/positively charge the amine groups now incorporated into the wood. A sample of the resulting aminated wood block will be tested to determine the percent incorporation of amine groups.

Step 4B—Formation of a Barrier: An aqueous exfoliated suspension of negatively charged clay platelets will be formed by adding approximately 1 g of suitable clay (e.g., Laponite® clay) per 50 mL water, and stirring until clear. The aminated wood block of Step 4A will be pressure-treated with the aqueous suspension so that the negatively charged exfoliated clay platelets form a barrier at the wood by electrostatic association with the positively charged amine groups.

Figure 8:
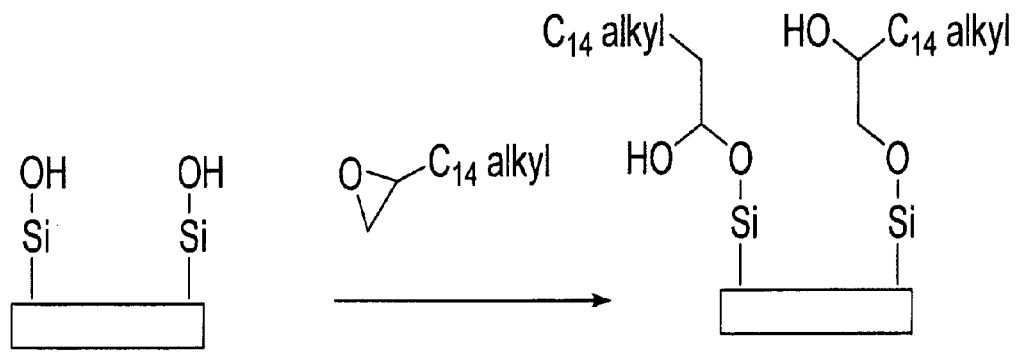
FIG. 8 illustrates the functionalization of clay platelets with C14 alkyl groups by an addition reaction according to an embodiment described in this document.

Step 4C—Functionalization of Barrier with Wood Preservatives: The clay platelets at the wood will be functionalized by an addition reaction, as shown in FIG. 8, between a commercially available C14 alkyl glycydyl ether and available Si—OH groups on the surface of the clay platelets. This will result in surface functionalization of the clay platelets with the C14 alkyl groups. The Douglas fir block having cationic wood cell walls and negatively charged clay platelets functionalized with C14 alkyl groups will display improved resistance to mold, fungi, bacteria, and insect attack relative to a similar untreated wooden cedar block.

EXAMPLE 5

Functionalization of Treated Cedar Wood with Wood Preservatives

Figure 9:
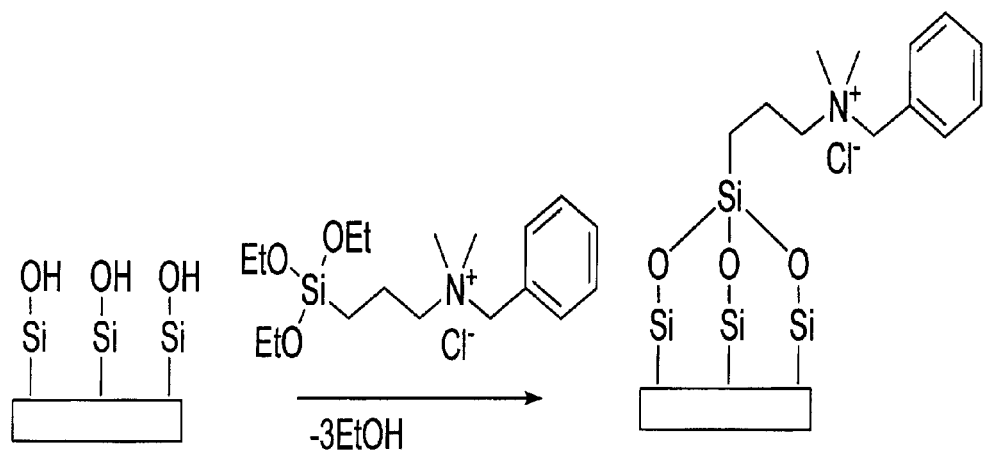
FIG. 9 illustrates the functionalization of clay platelets with a quaternary ammonium group by a condensation reaction according to an embodiment described in this document.

The clay platelets in a cedar wood sample prepared according to Steps 1A and 1B of Example 1 will be functionalized by a condensation reaction, as shown in FIG. 9, between benzyldimethyl(3-(triethoxysilyl)propyl)ammonium chloride (CAS Reg. No. 85391-03-3) and available Si—OH groups on the surface of the clay platelets. This will result in surface functionalization of the clay platelets with a quaternary ammonium group. The wooden cedar block having cationic wood cell walls and negatively charged clay platelets functionalized with quaternary ammonium groups will display improved resistance to mold, fungi, bacteria, and insect attack relative to a similar untreated wooden cedar block.

EXAMPLE 6

Functionalization of Treated Cedar Wood with Wood Preservatives

Figure 10:
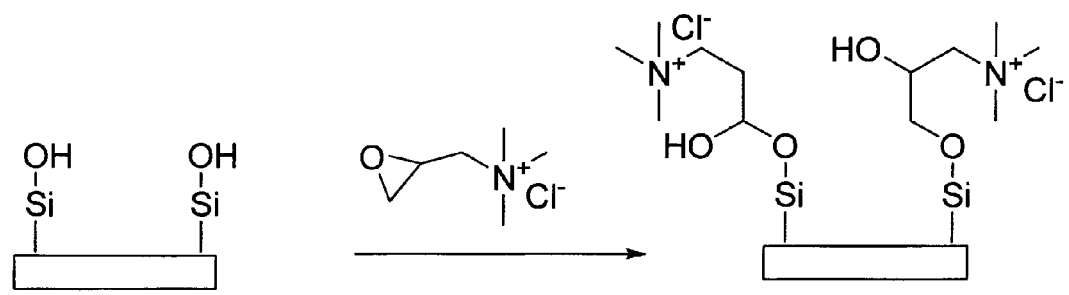
FIG. 10 illustrates the functionalization of clay platelets with a quaternary ammonium group by a condensation reaction according to an embodiment described in this document.

The clay platelets in a cedar wood sample prepared according to Steps 1A and 1B of Example 1 will be functionalized by a condensation reaction, as shown in FIG. 10, between glycidyl trimethylammonium chloride (CAS Reg. No. 3033-77-0) and available Si—OH groups on the surface of the clay platelets. The reaction will result in surface functionalization of the clay platelets with a quaternary ammonium group. The wooden cedar block having cationic wood cell walls and negatively charged clay platelets functionalized with quaternary ammonium groups will display improved resistance to mold, fungi, bacteria, and insect attack relative to a similar untreated wooden cedar block.

EXAMPLE 7

Functionalization of Treated Cedar Wood with Wood Preservatives

Figure 11:
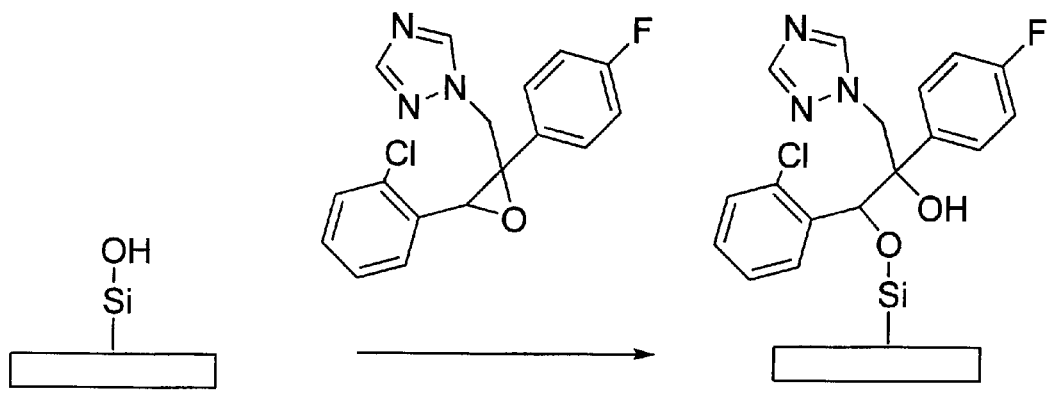
FIG. 11 illustrates the functionalization of clay platelets with a triazole group by a condensation reaction according to an embodiment described in this document.

The clay platelets in a cedar wood sample prepared according to Steps 1A and 1B of Example 1 will be functionalized by a condensation reaction, as shown in FIG. 11, between epoxiconazole (CAS Reg. No. 135319-73-2) and available Si—OH groups on the surface of the clay platelets. The reaction will result in surface functionalization of the clay platelets with a triazole group. The wooden cedar block having cationic wood cell walls and negatively charged clay platelets functionalized with such an triazole group will display improved resistance to mold and fungi relative to a similar untreated wooden cedar block.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated in this document, will be apparent to those skilled in the art from the foregoing descriptions. Such modifications and variations are intended to fall within the scope of the appended claims. The present disclosure includes the full scope of equivalents to which the claims are entitled. It is to be understood that this disclosure is not limited to particular methods, reagents, compounds, compositions or biological systems, which can, of course, vary. It is also to be understood that the terminology used in this document is for the purpose of describing particular embodiments only, and is not intended to be limiting.

With respect to the use of substantially any plural and/or singular terms in this document, those having skill in the art can translate from the plural to the singular and/or from the singular to the plural as is appropriate to the context and/or application. The various singular/plural permutations may be expressly set forth in this document for sake of clarity.

It will be understood by those within the art that, in general, terms used in this document, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed in this document also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed in this document can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 bonds refers to groups having 1, 2, or 3 bonds. Similarly, a group having 1-5 bonds refers to groups having 1, 2, 3, 4, or 5 bonds, and so forth.

From the foregoing, it will be appreciated that various embodiments of the present disclosure have been described in this document for purposes of illustration, and that various modifications may be made without departing from the scope and spirit of the present disclosure. Accordingly, the various embodiments disclosed in this document are not intended to be limiting, with the true scope and spirit being indicated by the following claims.

The invention claimed is:

1. A method of treating wood, the method comprising:
    modifying a cell wall of the wood to be positively charged to form a cationic wood cell wall, wherein the cationic wood cell wall comprises a —$NH_3^+$ group, a quaternary ammonium group, a quaternary phosphonium group, a formamidinium group, or a cationic heterocyclic group; and
    contacting a negatively charged silicon layer to the cationic wood cell wall to form a barrier, wherein the negatively charged silicon layer comprises a silicate ester group, a silinol group, a silicon oxide group, or a combination thereof.

2. The method of claim 1, wherein contacting the negatively charged silicon layer to the cationic wood cell wall comprises contacting a silicate clay platelet to the cationic wood cell wall.

3. The method of claim 2, wherein contacting the silicate platelet to the cationic wood cell wall comprises contacting synthetic calcium silicate hydrate, natural silicates, synthetic silicates, alumino silicates, silicon dioxide, nesosilicate, sorosilicate, cyclosilicate, inosilicate, phyllosilicate, tectosilicate, salts thereof, or a combination thereof to the cationic wood cell wall.

4. The method of claim 1, further comprising attaching a wood preservative to the barrier.

5. The method of claim 4, wherein attaching the wood preservative to the barrier comprises attaching a silicon alkoxide, a silane group, a silanol group, or a combination thereof to the barrier.

6. The method of claim 4, wherein attaching the wood preservative to the barrier comprises attaching water-proofing agents, biocides, antibiotics, fungicides, mildewcides, insecticides, preservatives, antimicrobial agents, or a combination thereof to the barrier.

7. The method of claim 4, wherein attaching the wood preservative to the barrier comprises attaching an alkyl triethoxysilane, a triethyoxysilane bonded to a siloxane polymer, or a combination thereof to the barrier.

8. The method of claim 1, wherein modifying the cell wall comprises amination, hydroxyethylation, protonation, or a combination thereof.

9. The method of claim 1, wherein modifying the cell wall comprises performing reductive amination of cellulose using a compound selected from ammonia, ammonium hydroxide, or an alkylamine.

10. The method of claim 1, wherein modifying the cell wall comprises selective amination of lignin using diethylaminoepoxypropylamine.

11. The method of claim 4, wherein attaching a wood preservative comprises using a condensation reaction or an addition reaction.

12. The method of claim 1, wherein modifying the cell wall comprises performing covalent modification of the cell wall.

13. The method of claim 1, wherein attaching the negatively charged silicon layer comprises attaching the negatively charged silicon layer using a single step reaction.

14. The method of claim 1, wherein contacting the negatively charged silicon layer to the cationic wood cell wall comprises contacting a silicate clay platelet having a diameter of about 1 nanometer to about 50 nanometers to the cationic wood cell wall.

15. The method of claim 1, wherein modifying the cell wall of the wood comprises performing aminoalkylation of hydroxyl groups of lignin by a dialkylamine-substituted epoxy compound.

16. The method of claim 1, wherein modifying the cell wall of the wood comprises performing aminoalkylation of hydroxyl groups of cellulose by a dialkylamine-substituted epoxy compound.

17. The method of claim 1, wherein modifying the cell wall of the wood comprises contacting the cell wall with a compound having an amine group in the presence of a base catalyst to form an amine cell wall.

18. A treated wood composition formed by a method, the method comprising:
    modifying a cell wall of the wood to be positively charged to form a cationic wood cell wall, wherein the cationic wood cell wall comprises a —$NH_3^+$ group, a quaternary ammonium group, a quaternary phosphonium group, a formamidinium group, or a cationic heterocyclic group; and
    contacting a negatively charged silicon layer to the cationic wood cell wall to form a barrier, wherein the negatively charged silicon layer comprises a silicate ester group, a silinol group, a silicon oxide group, or a combination thereof.

19. The composition of claim 18, wherein the silicon layer comprises a silicate clay platelet.

20. The composition of claim 18, wherein the silicon layer comprises synthetic calcium silicate hydrate, natural silicates, synthetic silicates, alumino silicates, silicon dioxide, nesosilicate, sorosilicate, cyclosilicate, inosilicate, phyllosilicate, tectosilicate, salts thereof, or a combination thereof.

21. The composition of claim 18, wherein the silicon layer is attached to the cell wall through a charge-charge interaction.

22. The composition of claim 18, further comprising a wood preservative attached to the silicate platelet.

23. The composition of claim 18, further comprising a wood preservative selected from water-proofing agents, biocides, antibiotics, fungicides, mildewcides, insecticides, preservatives, antimicrobial agents, or a combination thereof that is attached to the silicate platelet.

24. The composition of claim 18, further comprising a wood preservative comprising a silicon alkoxide group, a silane group, silanol group, or a combination thereof that is attached to the silicate platelet.

25. The composition of claim 18, further comprising a wood preservative selected from an alkyl triethoxysilane, a triethyoxysilane bonded to a siloxane polymer, or a combination thereof that is attached to the silicate platelet.

* * * * *

UNITED STATES PATENT AND TRADEMARK OFFICE
CERTIFICATE OF CORRECTION

PATENT NO. : 8,951,611 B2
APPLICATION NO. : 13/387546
DATED : February 10, 2015
INVENTOR(S) : Lee et al.

It is certified that error appears in the above-identified patent and that said Letters Patent is hereby corrected as shown below:

Title Page,

Item (56), under "OTHER PUBLICATIONS", in Column 2, Line 4, delete "printed" and insert -- (printed --, therefor.

Item (57), under "ABSTRACT", in Column 2, Line 6, delete "silino!" and insert -- silanol --, therefor.

Item (57), under "ABSTRACT", in Column 2, Line 10, delete "silinol" and insert -- silanol --, therefor.

In the Specification,

In Column 8, Line 45, delete "interne," and insert -- internet, --, therefor.

In the Claims,

In Column 13, Line 21, in Claim 1, delete "silinol" and insert -- silanol --, therefor.

In Column 14, Line 33, in Claim 18, delete "silinol" and insert -- silanol --, therefor.

Signed and Sealed this
Fourth Day of August, 2015

Michelle K. Lee
*Director of the United States Patent and Trademark Office*